Aug. 21, 1962     J. FAISANDIER     3,050,036
SERVO CONTROL SYSTEM TO ENSURE THE ROTATION OF A TURNING MASS
Filed April 7, 1961     2 Sheets-Sheet 1
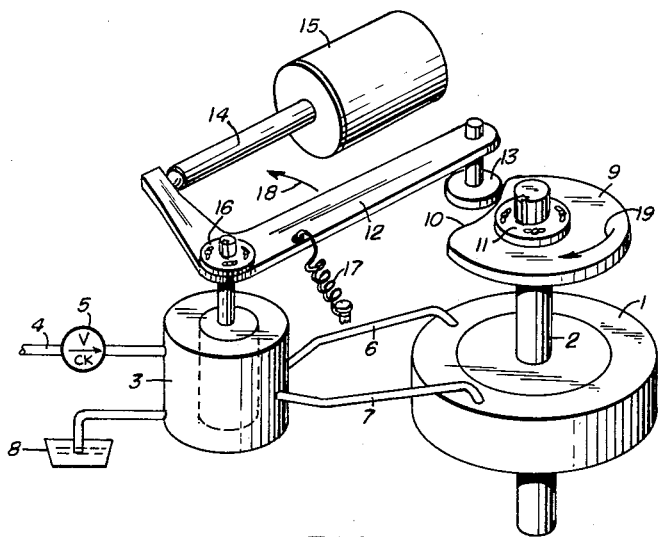
FIG.1
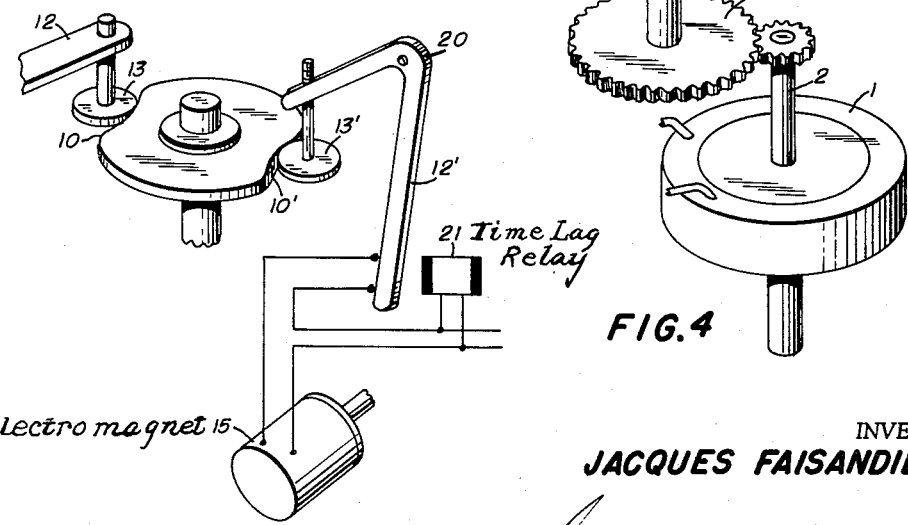
FIG.3
FIG.4
INVENTOR
JACQUES FAISANDIER
ATTORNEYS

3,050,036
SERVO CONTROL SYSTEM TO ENSURE THE ROTATION OF A TURNING MASS
Jacques Faisandier, 32 Blvd. Felix Faure, Chatillon-sous-Bagneux, France
Filed Apr. 7, 1961, Ser. No. 101,562
Claims priority, application France Apr. 21, 1960
6 Claims. (Cl. 121—41)

The invention has as object a servo control system, itself controlled by electric impulses, and ensuring the rotation, in principle of 360°, of a turning mass, it being possible to repeat the operational cycle indefinitely at each fresh impulse.

The servo control system according to the invention is a hydraulic one and is controlled electro-magnetically; it enables response times of the order of a few hundredths of a second to be obtained, and does not get behindhand in its synchronisation if the hydraulic pressure fails by accident. It also permits simple control of the rotation speed.

The servo control system according to the invention comprises a hydraulic motor to ensure the movement of the turning mass, a plane cam of cylindrical or other shape whose rotational movement is integral with that of the shaft and which enables the feed-back of the output movement, a valve distributor which may preferably be of the rotary type and which controls the supply to the said hydraulic motor, and whose movement is controlled by the said cam, and an electro-magnet which, by way of any suitable transmission means, initiates the movement of the distributor and thereby the movement of the said cam whose shape ensures continuation of the movement.

There is described hereinafter an embodiment of the inventive idea, this embodiment being non-limitative and given by way of example only. In the attached drawings:

FIGURE 1 is a diagrammatic perspective view of the servo control assembly.

FIGURE 3 is a diagrammatic perspective view of a modified device.

FIGURE 4 is a diagrammatic perspective view showing use of gear means between the motor being controlled and the control cam.

Figure 2:
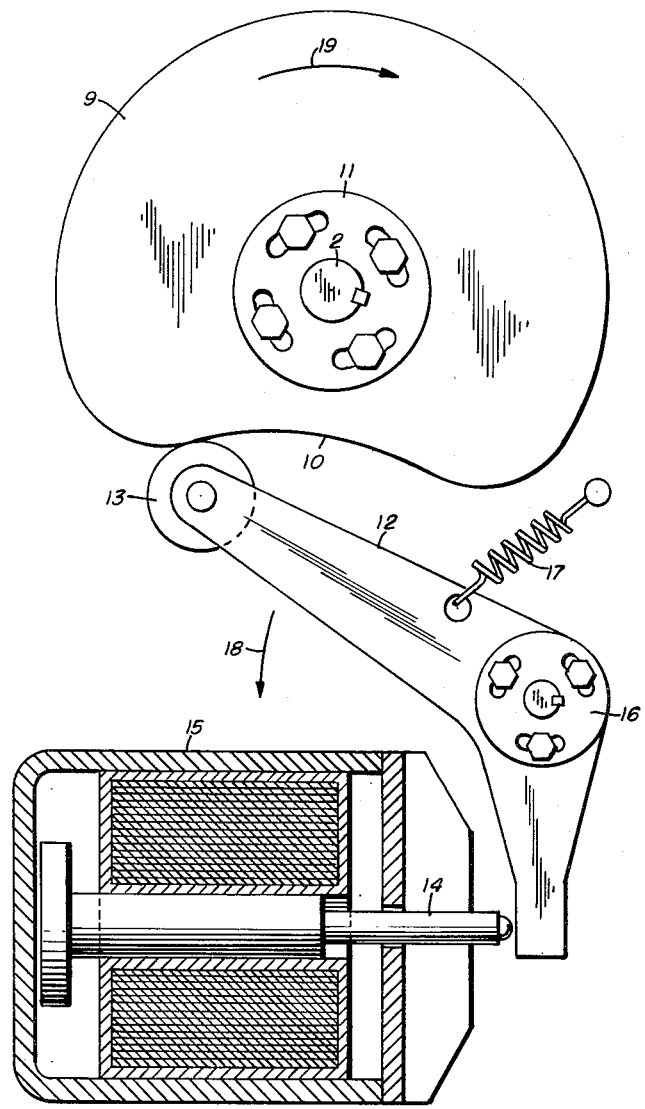
FIGURE 2 is a diagrammatic representation of part of the servo control assembly, and cam and lever being shown.

1 indicates a rotary hydraulic motor of any conventional type, whose output shaft 2 engages the turning mass, which is not shown in the drawings. The distributor 3, of the conventional rotary type, controls the supply of liquid fed in under pressure through pipe 4 and by way of non-return valve 5. The distributor pipes 6 and 7 can be caused to communicate alternatively with 4, whereas the other pipe is in communication with the tank 8. According to whether the pressure is imparted to the motor through 6 or 7, the motor 1 will turn in one direction or the other. The cam 9 is keyed to shaft 2, the former having constant radius over the greater part of its periphery. A control means is provided at 11 and is represented by arcuate slots which permit alteration of the keying angle corresponding to the neutral position of the motor, these arcuate slots being associated with locking nuts and bolts.

On the shaft of the distributor 3 is keyed the bent lever 12 carrying the roller 13 which rolls on the cam. The plunger 14 of a conventional control electro-magnet 15 acts on the lever 12. It is also possible to control the maximum speed of shaft 2 by a device 16 similar to that described in relation to 11.

A spring 17 continuously urges the roller 13 to bear against cam 9.

Control of the distribution is intended to be such that when lever 12 turns in the direction indicated by arrow 18 the motor will turn in the opposite direction (indicated by arrow 19).

The manner of operation is as follows:

It is assumed that FIGURE 2 shows the apparatus in the rest position. It can be seen that the neutral point does not correspond to keying or locking at point 10. It is one of the advantages of the control system that the keying, such as it is shown, gives a stable neutral position without any need for locking.

If the electro-magnet 15 is energised it slightly shifts the lever 12 which turns in the direction shown by arrow 18, thus causing the motor 1 to be started in the opposite direction; the roller 13 is moved slightly away from the cam until it resumes contact with this cam owing to the rotation of the latter. The movement is continued until the cam has made a complete revolution and has returned to the position shown in the drawing.

The length of the impulse is intended to be such that the roller will pass the area of minimum radius of the cam without falling back.

Obviously there can be used, instead of a single point 10 of minimum radius, several such points of minimum radius, and such an arrangement would permit the number of stops per complete revolution of the cam to be multiplied and thus the angle of rotation to be reduced. In FIGURE 3, the cam 9 is represented with two incurved concave portions 10, 10′, diametrically disposed, and with two followers 13 and 13′. The follower 13′ is carried by a lever 12′ similar to lever 12 and pivoted at 20, which controls a time lag relay 21 controlling the electro-magnet 15, to automatically cause resumption of the movement after each stop.

There can also be inserted a reduction means 22, as seen in FIG. 4, between the shaft of the cam and shaft 2 in such a way that the stop will be caused at the end of $n$ revolutions, $n$ being an integer or a fraction and greater or smaller than unity.

What I claim is:

1. In an hydraulic servo control system including an actuating member and a valve distributor having a valve controlled by said actuating member, an hydraulic motor controlled by said valve distributor, a source of impulses, said actuating member being actuated by said source, the provision of a rotary cam member operatively connected to said motor, a follower permanently controlled by said cam member and operatively connected to said actuating member whereby the displacement of said actuating member in response to an impulse received from said source initiates the rotary movement of said cam member, which movement serves to further maintain and control the displacement of said actuating member.

2. In the system as set forth in claim 1, said cam member having a peripheral cam surface, having a constant radius over the greater part of its periphery and at least one incurved concaved portion.

3. In the system as set forth in claim 2, spring means to press said follower against said cam surface.

4. In the system as set forth in claim 1, adjustable means to adjust the position of said cam member relatively to said motor.

5. In the system as set forth in claim 1, adjustable means to adjust the position of said actuating member relatively to said source.

6. In the combination of an hydraulic motor including a rotary shaft, a source of hydraulic fluid for said motor, a vlave, and a pipe system leading from said source of hydraulic fluid to said hydraulic motor through said valve, a control device comprising a cam disc mounted on said rotary shaft, a valve operating lever arm mounted on said valve and carrying a cam follower biased against said cam disc, said cam disc including portions of such configuration as to hold said valve operating lever arm in the position to deliver hydraulic fluid to said motor, and including at least one portion of such configuration as to position said lever arm in the position to shut off fluid to said hydraulic motor, and means independent of said cam to move said lever to initiate opening of said valve.

References Cited in the file of this patent

UNITED STATES PATENTS

| | | |
|---|---|---|
| 2,579,566 | Godfriaux | Dec. 25, 1951 |
| 2,610,614 | Sedgwick | Sept. 16, 1952 |
| 2,655,132 | Scheib | Oct. 13, 1953 |